W. W. HUMES.
RAISING AND LOWERING DEVICE FOR ROLLS.
APPLICATION FILED SEPT. 25, 1916.

1,241,630.

Patented Oct. 2, 1917.

Witnesses

W. W. Humes, Inventor by Attorneys

UNITED STATES PATENT OFFICE.

WILLIAM W. HUMES, OF YOUNGSTOWN, OHIO.

RAISING AND LOWERING DEVICE FOR ROLLS.

1,241,630.  Specification of Letters Patent.  Patented Oct. 2, 1917.

Application filed September 25, 1916. Serial No. 122,150.

*To all whom it may concern:*

Be it known that I, WILLIAM W. HUMES, a citizen of the United States, residing at Youngstown, in the county of Mahoning and State of Ohio, have invented a new and useful Raising and Lowering Device for Rolls, of which the following is a specification.

The present invention relates to a device for adjusting the roll or rolls of a rolling mill, or the like, and aims to provide a novel and improved adjusting mechanism for a roll or other object.

It is the object of the invention to provide a raising and lowering device having a novel combination and arrangement of the component elements, to enhance the utility and efficiency of the device, the device also being simple and inexpensive in construction.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1:
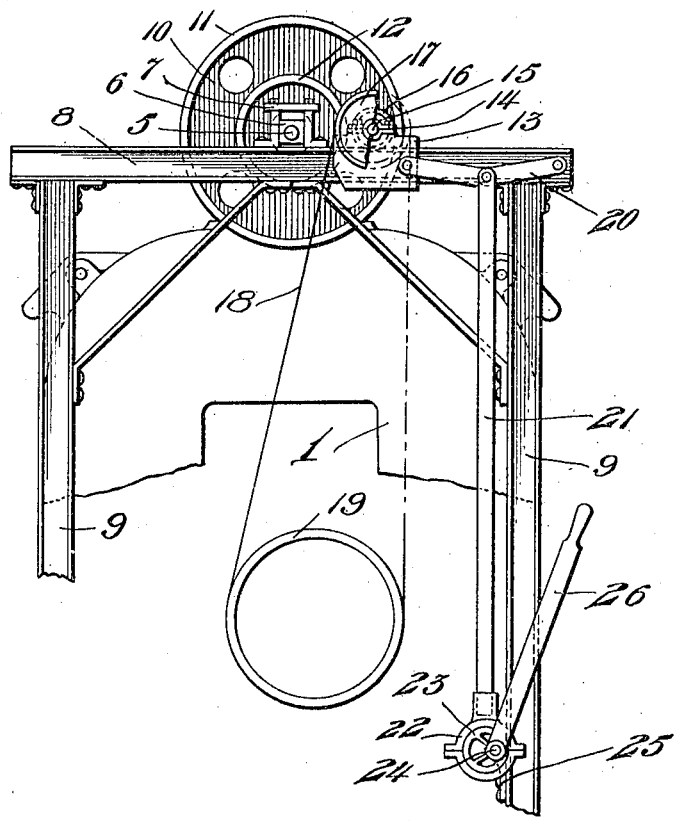
Figure 1 is an elevation of the device, portions being broken away.
Figure 2:
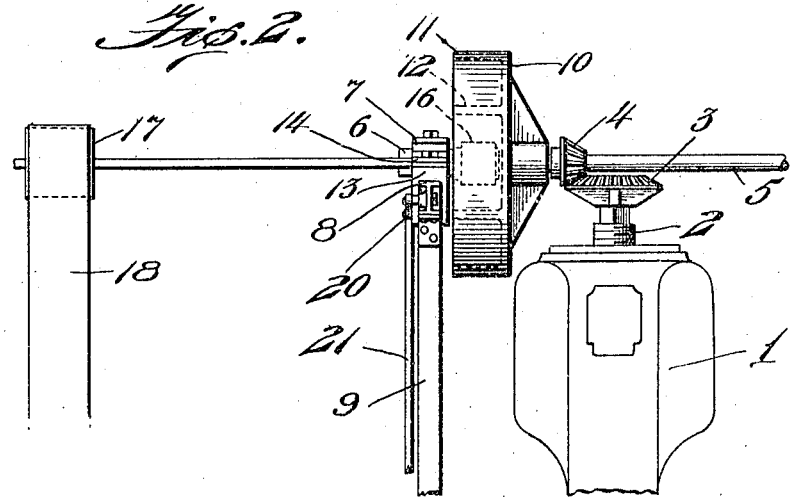
Fig. 2 is another elevation, the line of view being at right angles to the line of view in Fig. 1, and portions being broken away.

In the drawing, there is delineated the upper portion of the usual roll housing 1, at the upper end of which the roll adjusting screw 2 is shown, said screw being rotatable in opposite directions for either raising or lowering the roll, but it will be evident that the present device can be used for adjusting various objects.

A bevel gear 3 is attached to the upper end of the screw 2 and meshes with a bevel gear or pinion 4 keyed upon a horizontal shaft 5 mounted above the housing 1, and having one end journaled in a bearing 6 fitted within a bracket 7 upstanding from a beam 8. This beam 8 is secured upon a pair of standards or posts 9 to provide a supporting arch for the present device.

A wheel 10 is keyed upon the shaft 5 at one side of the beam 8, and is provided with concentric flanges 11 and 12 projecting from one side toward the beam 8. The adjacent surfaces of the flanges 11 and 12 are adapted for the frictional engagement of a friction wheel, as will presently appear.

A slide 13 straddles the beam 8 and is slidable thereon, and carries a bearing 14 through which a shaft 15 is journaled. A friction wheel 16 is secured upon the protruding terminal of the shaft 15 which projects between the flanges 11 and 12, and said wheel 16 is of a diameter less than the distance between said flanges. The wheel 16 is movable into and out of engagement with either flange 11 or 12, and can be brought to an intermediate position disengaged from both flanges.

The shaft 15 can be driven continuously, during the operation of the machine, by any suitable means, such as by means of a pulley wheel 17 secured upon the shaft 15 and connected by a belt 18 with a driving pulley wheel 19 operated by a prime mover.

The complete supporting means for the shafts 5 and 15 are not illustrated, since the remote ends of said shafts can be supported in any suitable manner, and the present invention does not concern the same.

As a means for adjusting the slide 13, a pair of toggle links 20 is provided, the remote ends thereof being pivoted on a substantially horizontal line to one side of the slide 13 and one side of the beam 8, as seen in Fig. 1. Pivoted to the joint of the links 20 is a substantially vertical bar 21. The upper end of said bar is connected to the toggle links, and the lower end thereof is attached to an eccentric strap 22 which surrounds an eccentric 23, which is in turn secured upon a rock shaft 24 journaled for rotation in a suitable bearing 25 attached to one post or standard 9. A suitable hand lever 26 is secured to the shaft 24 for turning the eccentric 23, to either raise or lower the bar 21.

The friction wheel 16 is rotated continuously, during the operation of the machine, and its position is controlled by the hand lever 26. By bringing the hand lever 26 in one direction, to raise the bar 21, the toggle links 20 are moved toward a straight line position, whereby to move the slide 13 toward the shaft 5, thus swinging the friction wheel 16 tightly into engagement with the friction flange 12, to rotate the wheel 10 and shaft 5 in one direction. This will rotate the screw 2 in one direction through the medium of the bevel gears 3 and 4. By swinging the lever 26 in the opposite direction, the joint of the links 20 is pulled downwardly by the bar 21, thus pulling the slide 13 away from the shaft 5, to remove the friction wheel 16 from the flange 12, and bring it into engagement with the inner surface of the flange 11, whereby the wheel 10, shaft 5 and screw 2 are now rotated in the opposite direction. When the friction wheel 16 is brought between and spaced from both flanges 11 and 12, the wheel 10 and its screw 2 will be at rest, although the friction wheel 16 can rotate idly between said flanges. By the provision of the eccentric 23 and toggle links 20, the slide 13 can be moved forcibly in either direction, to hold the friction wheel 16 tightly against either flange 11 or 12, whereby to prevent slipping.

The construction is compact, simple and inexpensive, but is nevertheless thoroughly efficient and practical in use.

Having thus described the invention, what is claimed as new is:

In a device of the character described, a supporting member having a post and a beam carried by said post, a wheel having a pair of flanges, a slide movable upon said beam and having a bearing, a shaft journaled in said bearing, a wheel carried by said shaft between and engageable with said flanges, toggle links having their remote ends pivoted to said slide and beam on a substantially horizontal line, a manually operable eccentric carried by said post, and a substantially vertical bar having its upper end pivoted to the joint of the toggle links and having an eccentric strap at its lower end embracing said eccentric.

In testimony that I claim the foregoing as my own, I have hereto affixed my signature in the presence of two witnesses.

WILLIAM W. HUMES.

Witnesses:
C. G. THOMAS,
C. H. LEWIS.

Copies of this patent may be obtained for five cents each, by addressing the "Commissioner of Patents, Washington, D. C."